(12) United States Patent
Sadri et al.

(10) Patent No.: US 7,245,879 B2
(45) Date of Patent: Jul. 17, 2007

(54) APPARATUS AND ASSOCIATED METHODS TO PERFORM INTELLIGENT TRANSMIT POWER CONTROL WITH SUBCARRIER PUNCTURING

(75) Inventors: Ali S. Sadri, San Diego, CA (US); Alexander A. Maltsev, Nizhny Novgorod (RU); Andrey V. Pudeyev, Nizhny Novgorod (RU); Vadim S. Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 610 days.

(21) Appl. No.: 10/750,561

(22) Filed: Dec. 31, 2003

(65) Prior Publication Data

US 2005/0032514 A1 Feb. 10, 2005

Related U.S. Application Data

(60) Provisional application No. 60/493,937, filed on Aug. 8, 2003.

(51) Int. Cl.
*H04B 17/00* (2006.01)
(52) U.S. Cl. ............... 455/67.11; 455/67.13; 455/67.14; 455/67.16; 370/208
(58) Field of Classification Search ......... 455/67.11, 455/67.13, 67.14, 67.16, 70; 370/208
See application file for complete search history.

(56) References Cited

U.S. PATENT DOCUMENTS

| 5,307,376 | A | * | 4/1994 | Castelain et al. | ........... 375/260 |
| 5,960,003 | A | | 9/1999 | Fischer et al. | |
| 2002/0058483 | A1 | * | 5/2002 | Shinichi et al. | ............... 455/90 |
| 2003/0043732 | A1 | * | 3/2003 | Walton et al. | ............. 370/208 |
| 2006/0116155 | A1 | * | 6/2006 | Medvedev et al. | ......... 455/522 |

FOREIGN PATENT DOCUMENTS

WO WO 2004/041634 A1 3/2004

OTHER PUBLICATIONS

Chi-Hsiao Yih et al; Adaptive modulation, power allocation and control for OFDM wireless networks—Personal, Indoor and Mobile Radio Communications, 2000., vol. 2, Sep. 18, 2000—pp. 809-813.
PCT Search Report Dated Nov. 10, 2004.

* cited by examiner

*Primary Examiner*—Matthew Anderson
*Assistant Examiner*—Tuan Pham
(74) *Attorney, Agent, or Firm*—Pearl Cohen Zedek Latzer, LLP

(57) ABSTRACT

An apparatus and associated methods to perform intelligent transmit power control with subcarrier puncturing in a multicarrier wireless communication channel is generally disclosed.

32 Claims, 4 Drawing Sheets

APPARATUS AND ASSOCIATED METHODS TO PERFORM INTELLIGENT TRANSMIT POWER CONTROL WITH SUBCARRIER PUNCTURING

CROSS-REFERENCE TO RELATED APPLICATIONS

The present application claims the benefit of U.S. Provisional Application Ser. No. 60/493,937, filed Aug. 8, 2003, entitled "A HIGH-THROUGHPUT WIRELESS NETWORK ARCHITECTURE, APPARATUS AND ASSOCIATED METHODS". In addition, the present invention claims priority to related application Ser. No. 10/330,675 filed Dec. 30, 2002 by Sadri, et al, entitled "SYSTEM AND METHOD FOR INTELLIGENT TRANSMITTED POWER CONTROL SCHEME"; and Application Ser. No. 10/738689 filed Dec. 16, 2003 by Maltsev, et al, entitled "AN ADAPTIVE MULTICARRIER WIRELESS COMMUNICATION SYSTEM, APPARATUS AND ASSOCIATED METHODS", the disclosures of which are expressly incorporated herein by reference.

TECHNICAL FIELD

Embodiments of the present invention are generally directed to wireless communication systems and, more particularly, to an apparatus and associated methods to perform intelligent transmit power control with subcarrier puncturing in a multiple carrier (multicarrier herein) wireless communication system is generally described.

BACKGROUND

A multicarrier communication system such as, e.g., Orthogonal Frequency Division Multiplexing (OFDM), Discrete Multi-tone (DMT) and the like, is typically characterized by a frequency band associated with a communication channel being divided into a number of smaller sub-bands (subcarriers herein). Communication of information (e.g., data, audio, video, etc.) between stations in a multicarrier communication system is performed by dividing the informational content into multiple pieces (e.g., symbols), and then transmitting the pieces in parallel via a number of the separate subcarriers. When the symbol period transmitted through a subcarrier is longer than a maximum multipath delay in the channel, the effect of intersymbol interference may be significantly reduced.

By simultaneously transmitting content through a number of subcarriers within the channel, multicarrier communication systems offer much promise for high-throughput wireless applications. Conventional techniques for increasing system throughput, i.e., the amount of content the channel can carry at any given time, emphasize the identification and exploitation of "good" subcarriers (e.g., those that offer a threshold data rate at or above a threshold performance characteristic (e.g., signal to noise ratio SNR)) over "bad" subcarriers, which are deactivated. The remaining, active subcarriers, are then processed to reach an "optimal" Shannon "water-filling" solution. Such conventional techniques are typically computationally expensive and do not provide a commensurate improvement in system throughput.

BRIEF DESCRIPTION OF THE DRAWINGS

Embodiments of the present invention are illustrated by way of example, and not by way of limitation, in the figures of the accompanying drawings in which like reference numerals refer to similar elements and in which.

DETAILED DESCRIPTION

Embodiments of a system, apparatus and associated methods to perform intelligent transmit power control with subcarrier puncturing are generally introduced herein. In this regard, according to but one example embodiment of the teachings of the present invention, an adaptive subcarrier management agent (SMA) is introduced to identifying underperforming subcarriers (e.g., failing to meet a signal to noise ratio (SNR) threshold), to essentially turn at least a subset of the identified subcarriers off (no transmit mode), and to effectively spread a power budget across the remaining (active) subcarriers to improve channel throughput at the same, or reduced, transmit power density.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Example Network Environment

Figure 1:
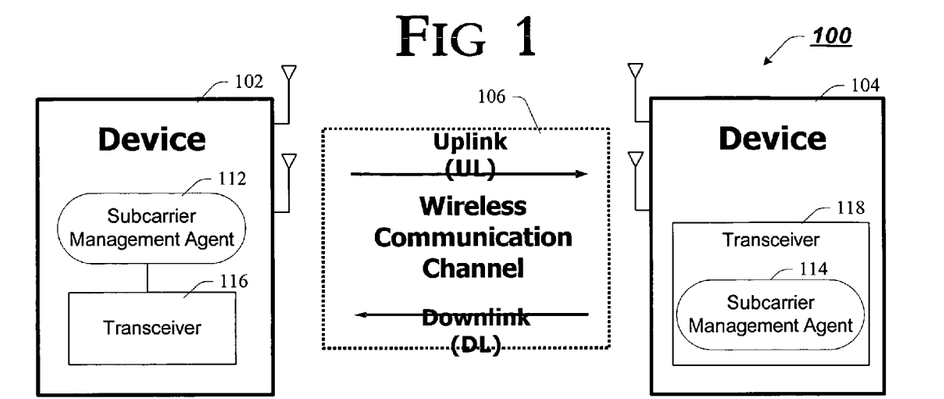
FIG. 1 is a block diagram of an example multicarrier wireless network incorporating the teachings of the present invention, according to one example implementation.

Referring now to FIG. 1, an example wireless communication environment 100 in which the teachings of the present invention may be practiced is presented, according to one example embodiment of the invention. As shown, network 100 is depicted comprising two or more electronic devices 102, 104 are selectively coupled in wireless communication through a communication channel 106 established between transceivers 116, 118 associated with the devices. In accordance with the teachings of the present invention, introduced above, devices 102, 104 each depict an embodiment of a subcarrier management agent (SMA) 112, 114, respectively, to implement one or more intelligent transmit power control with subcarrier puncturing technique(s) to provide improved channel throughput at a guaranteed performance level (e.g., channel quality, signal performance, noise immunity, etc.) over conventional techniques.

As used herein, transceivers 116, 118 may include a combination of transmitter and receiver functionality, and may well include one or more transmitter circuits and/or receiver circuit(s), although the invention is not limited in this regard. Transceivers 116, 118 are coupled with one or more antenna(e), which may provide one or both devices 102, 104 with spatial divisional multiple access (SDMA) (or, beamforming) or multiple input, multiple output (MIMO) system characteristics. As used herein, transceivers 116, 118 are intended to represent any of a wide range of multicarrier wireless communication transceivers including, for example, transceivers suitable for use within communication networks compliant with the Institute for Electrical and Electronics Engineers (IEEE), e.g., 802.11 task group "n" (colloquially referred to as 802.11n), 802.15 task group "3a" (802.15.3a), and the like, the enhanced data-rates for GSM evolution (EDGE) specification, and/or the third-generation partnership project (3GPP) specification, although the invention is not limited in this regard. According to one example implementation, transceivers 116, 118 may employ Orthogonal Frequency Division Multiplexing (OFDM), as introduced above.

Those skilled in the art will appreciate that the characteristics of the communication channel 106 are commensurate with the type of wireless transceiver 116, 118 employed by the devices (102, 104) to establish the channel. Thus, according to one example implementation, transceivers 116, 118 may selectively establish one or more OFDM wireless communication channels, e.g., channel 106, which may include one or more of an uplink component and a downlink component, at least one of which is comprised of a number of subcarriers. As used herein, the established wireless communication channel 106 facilitates the wireless exchange of information between the two devices 102, 104. Such information may include one or more of payload content (audio, video, data, etc.) as well as control content (e.g., channel state information, etc.).

In addition to the traditional notions of an uplink component and a downlink component carrying payload content, devices 102, 104 may exchange channel state information (CSI) via one or more communication paths (not particularly denoted) including, but not limited to, an in-band communication path (e.g., embedded within the communication channel 106), an out-of-band wireless communication path, or a wireline communication path.

As introduced above, electronic devices 102, 104 are depicted comprising an embodiment of a subcarrier management agent (SMA) 112, 114. As used herein, the SMA (112, 114) works in cooperation with at least a transmitter and/or a receiver element of a transceiver (116, 118) to selectively and dynamically control any one or more of a number of channel processing parameters of the transmitter and/or receiver to implement intelligent transmit power control with subcarrier puncturing technique(s). According to one embodiment, the channel processing parameters may include one or more of the bit loading, coding type, modulation type and/or power allocation among individual ones of at least a subset of the subcarriers comprising multicarrier communication channel 106. According to one example embodiment, SMA 112, 114 initiates this adaptive control of the channel processing parameter(s) of the transceiver in response to received (closed-loop mode) or perceived (open-loop, or blind mode) channel state information.

According to one embodiment, prior to transmission of information, SMA (112, 114) may dynamically determine which of the plurality of subcarriers to use in the channel (plurality of active subcarriers) and calculate one or more of the bit loading, coding type, modulation type and/or power allocation among individual ones of at least a subset of the subcarriers based, at least in part, on the channel state information. As developed more fully below, SMA 112, 114 performs this adaptive bit loading and power distribution among the subcarriers to provide improved channel performance (e.g., with regard to channel throughput) for a given quality level and within a given power budget.

The distinct reference numbers associated with SMA 112, 114 used herein are merely intended to denote that the implementation of SMA need not be exactly the same in each of the devices 102, 104. Indeed, in one embodiment, SMA 114 is depicted as being integrated within transceiver 118, while SMA 112 is merely coupled to an associated one or more transceiver(s) 116. Thus, it should be apparent that SMA's of varying complexity and implementation, which nonetheless perform at least the claimed invention, are anticipated within the scope and spirit of the present invention.

Example SMA Architecture

Figure 2:
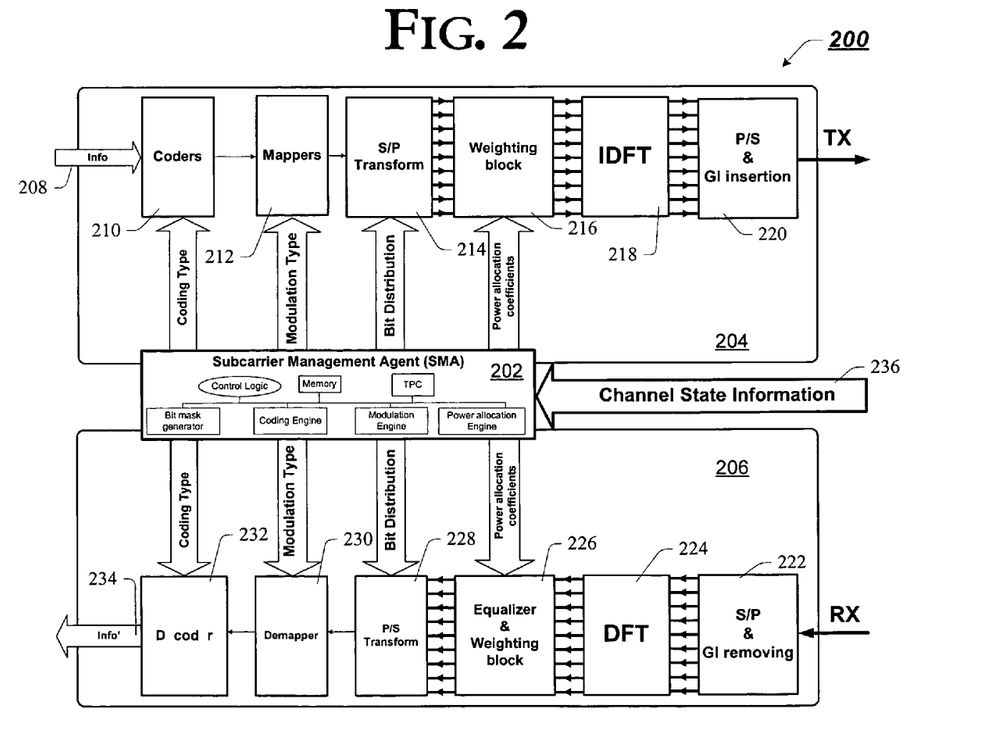
FIG. 2 is a block diagram of an example transceiver incorporating the teachings of the present invention, according to one example implementation.

Turning briefly to FIG. 2, a block diagram of an example subcarrier management agent (SMA) architecture 200 is introduced, according to one embodiment of the invention. For ease of description and clarity, subcarrier management agent (SMA) 202 is depicted functionally coupled with certain elements of a transmitter 204 and/or a receiver 206, although the invention is not limited in this regard. As used herein, SMA 200 may well be implemented in device 102 as SMA 112 and/or SMA 114 in device 104, although other embodiments of the SMA may well be used.

Within the context of FIG. 2, example SMA 202 is depicted comprising one or more of a control element, a transmit power control (TPC) manager to implement intelligent transmit power control with subcarrier puncturing technique(s), a bit mask generator, a coding engine, a modulation engine, a power allocation engine, and associated memory facilities, although the invention is not limited in this regard. It should be appreciated that in alternate embodiments, one or more elements of SMA 202 may well be combined, removed, or split among several functional elements without deviating from the scope and spirit of the present invention. As used herein, one or more elements of the SMA 202 may well be implemented in one or more of hardware, software, firmware and/or a combination thereof.

According to one embodiment, SMA 202 selectively invokes an instance of intelligent transmit power control with subcarrier puncturing to control one or more channel processing features (bit loading, modulation type, coding type, power coefficients, etc.) of an associated transmitter 204 and/or receiver 206 based, at least in part, on received or perceived channel state information (CSI) 236 to improve channel throughput (e.g., measured in terms of data rate, etc.). According to one embodiment, SMA 202 may receive channel state information (CSI) 236 from a remote device, or perceive channel state information (CSI) via a local receiver.

As used herein, CSI 236 may well comprise one or more of a channel transfer function, or estimate thereof, one or more radio frequency (RF) signal characteristics, and/or one or more channel quality parameters. That is, CSI 236 may include a channel transfer function estimate in the frequency or time domain. CSI 236 may include one or more radio frequency (RF) channel performance indicators such as, e.g., signal to noise ratio (SNR), signal-to-interference and noise ratio (SINR), a received signal strength indication (RSSI), and the like. CSI 236 may well include one or more channel quality parameters associated with information decoded from a received signal such as, for example, a bit error rate (BER), a packet error rate (PER), a symbol error rate (SER), and the like. CSI 236 may include one or more channel processing parameters (e.g., the bit loading, coding type, modulation type and/or power allocation), calculated by the SMA of remote device. According to one embodiment, CSI 236 is associated with one or more prior transmissions via the channel 106.

To improve channel throughput SMA 202 may selectively modify the channel processing performed in the associated transmitter (204) and/or receiver (206) to provide an optimum throughput within a given power budget. In this regard, according to one example embodiment, in each of the subsets of subcarriers comprising the multicarrier channel 106, subcarriers are appointed, e.g., according to a combination of modulation and encoding type (referred to herein as RATE combinations, or subcarrier subsets), and the rescaling of subcarrier powers is performed. The number of subcarriers in each RATE subset is adaptively determined, although the scope of the invention is not limited in this regard.

Briefly, the example transmitter 204 of FIG. 2 is depicted comprising one or more coder(s) 210, mapper(s) 212, a serial to parallel transform block 214, weighting block(s) 216, inverse discrete Fourier transform (IDFT) element(s) 218, and a parallel-to-serial transform with guard interval (GI) insertion element 220 to generate an output (TX) signal, although the invention is not limited in this regard. According to one embodiment, an inverse fast Fourier transform function (IFFT) is used for at least a subset of the IDFT element(s) 218.

As shown, transmitter 204 receives information 208 at the coders, which encodes the content in accordance with control input received from SMA 202. Any of a number of coding rates may well be employed e.g., ½, ⅔, ¾, ⅚, ⅞, and 1. Once encoded, the content is passed to mappers, wherein an appropriate modulation technique is applied to the content. According to one embodiment, any one or more of BPSK, QPSK, 8-PSK, 16QAM, 64QAM, 128QAM, 256QAM, and the like, modulation techniques may be used, although the invention is not limited in this regard.

The modulated output is passed to a serial to parallel transform block 214, which dynamically maps the encoded, modulated content to one or more substreams, in accordance with a bit distribution mask received from SMA 202. The plurality of substreams are passed to a weighting block 216, which applies power allocation coefficients, e.g., provided by SMA 202, before being processed by the inverse discrete Fourier transform (IDFT) 218. The IDFT 218 converts the content from the frequency domain into the time domain. The output of IFFT 218 is passed through a parallel-to-serial converter block 220 to generate an output signal, where a cyclic prefix or guard interval (GI) may be applied in accordance with an OFDM system, although the invention is not limited in this regard. Elements of the output signal may be directed to a select one or more antenna(e) (not particularly denoted) for transmission as an element (uplink or downlink) of a wireless communication channel.

According to one example embodiment, SMA 202 may generate one or more of a bit mask, coding control content, mapper control content and/or power allocation coefficients (or, weights) to one or more of serial to parallel transform block 214, coder(s) 210, mapper(s) 212 and/or weighting block 216 to adaptively control bit loading and power allocation among individual subcarriers to provide maximal throughput within a given power budget.

As shown, receiver 206 may receive a wireless signal, e.g., via communication channel 106, and process the signal to generate a representation 234 of information embedded within the received multicarrier signal 106. In this regard, receiver 204 is depicted comprising one or more of serial-to-parallel converter and GI removal element(s) 222, discrete Fourier transform (DFT) element(s) 224, equalizer and weighting element(s) 226, parallel to serial transform element(s) 228, demapper(s) 230 and decoder(s) 232 to generate a representation (info') 234 of information 208 embedded within the received signal.

In accordance with the illustrated example embodiment, the signal received by receiver 206 is a multicarrier, e.g., OFDM, signal. According to one example implementation developed more fully below, one or more element(s) of receiver 206 receive control content (e.g., bit distribution mask, coding type, modulation type and/or power allocation coefficients) from the SMA 202 to control one or more processing characteristics (e.g., demodulation, decoding, etc.) of individual ones of the received subcarriers.

According to one example implementation, one or more of parallel-to-serial transform block 228, decoder(s) 232, demapper(s) 230 and/or weighting block 226 may receive control content from SMA 202 to adaptively control the recovery of content from individual subcarriers. According to one example embodiment, the control content provided by SMA 202 to one or more element(s) 226-232 of receiver 206 is commensurate with and complimentary to the control content provided to the transmit element. According to one embodiment, the transmit 204 and receive 206 elements may support multiple disparate communication channels, wherein the control content provided to the transmitter and receiver is appropriate for each of the given communication channels.

Thus, according to one example embodiment introduced above and developed more fully below, SMA 202 may adaptively modify one or more of a bit distribution mask, a coding type, a modulation type, and/or power allocation coefficients applied to one or more elements of an associated transmitter and/or receiver, as shown, to improve the channel throughput within a given power budget. The detail of how these modifications are made, and which elements of the SMA 202 may perform such processes is described more fully below, with reference to FIGS. 3-6.

Example SMA Operation

Figure 3:
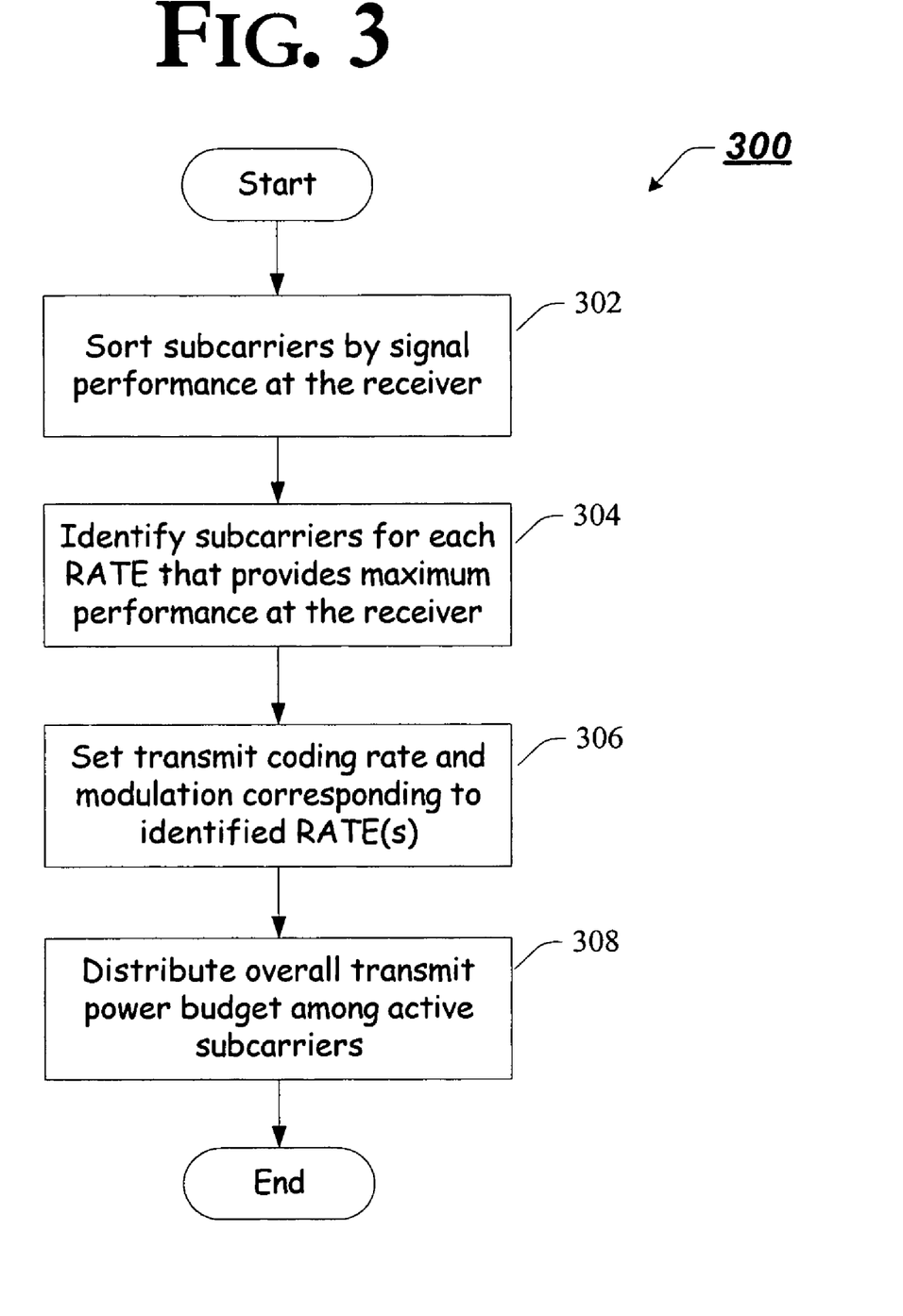
FIG. 3 is a flow diagram illustrating an example method for performing transmit power control with subcarrier puncturing, according to embodiments of the invention.

Turning to FIG. 3, a flow chart of an example method 300 of performing intelligent transmit power control with subcarrier puncturing is generally described. As used herein, characteristics of the communication channel may well include one or more of subcarrier power gains $\lambda_i=|H_i|^2$, where $H_i$ is the channel transfer function for the $i^{th}$ subcarrier, subcarrier noise powers $\sigma^2_{n,i}$, and the like.

According to one embodiment, these values may be used by SMA 202 in the determination of an optimal power allocation $P_i$ (where $P_i$ is the power allocated to the $i^{th}$ subcarrier, and $P_{total}$ is assumed to be constant) through subcarriers at the transmitter side under a criterion of data rate (or, channel throughput) maximization for a given channel quality performance metric (e.g., BER) at the receiver side of the channel, although the invention is not limited in this regard. According to one embodiment, SMA 202 may implement the intelligent transmit power control with subcarrier puncturing technique(s) in one or more of at least two modes of operation: an open-loop (blind) mode and a closed-loop mode. Briefly, in the closed-loop mode, a receiving device computes one or more channel characteristics based on a prior transmission, determines the active subcarriers and power allocation in accordance with the techniques described below, and sends this information back to a transmitter of the channel, e.g., through an in-band or out-of-band service channel. In the open-loop mode, the transmitting device may estimate the channel characteristics/conditions, which are then used to determine the active subcarriers and power allocation among them. According to one example implementation, the transmitting device may include the information necessary for successive processing of the OFDM signals into header information, e.g., in the signal field following the preamble of the signal.

In accordance with the illustrated example embodiment, the power control technique(s) introduced herein begin with block 302, where an SMA 202 (e.g., in a receiving device 104) sorts the subcarriers according to some criterion at the receiver. In this regard, according to one embodiment, the transmit power control manager of SMA 202 may compute an effective noise power $\sigma_i^2$ in at least a subset of the subcarriers using one or more channel characteristics. According to one example embodiment, the channel characteristics may include any one or more of observed radio frequency (RF) signal characteristics (SNR, SINR, RSSI, fading characteristics, etc.) of the channel (106) and/or channel quality performance characteristics (BER, PER, FER, SER, etc.) associated with the decoded content received via the channel. The determination of the one or more channel characteristics may well be performed in accordance with a conventional operation of receiver (206), or may well be performed by one or more element(s) of SMA (118) of device 104.

According to one embodiment, the transmit power control manager of SMA 202 may determine the effective noise power in each subcarrier as:

$$\sigma_i^2 = \frac{\sigma_{n,i}^2}{\lambda_i}$$

(again, where $\sigma_i^2$, is the subcarrier noise power in the $i^{th}$ subcarrier, and $\lambda_i$ is the subcarrier power gain associated with the channel transfer function for the $i^{th}$ subcarrier), although the invention is not limited in this regard.

Once the effective noise power of the subcarriers is known, the transmit power control manager of SMA 202 may sort the subcarriers (e.g., in ascending order) by their effective noise power: e.g., $\sigma_1^2 = \sigma_{min}^2$ and $\sigma_{N_{sc}}^2 \sigma_{max}^2$. According to one embodiment, SMA 202 uses a sorting index table to track the real places of the subcarriers within the channel spectrum, although the invention is not limited in this regard. In this regard, SMA 202 maintains an order and understanding of the allocation of the subcarriers within the spectrum.

In block 304, SMA 202 identifies one or more subcarriers for each combination of coding rate and modulation type (RATE) that provides a maximum throughput performance level at the receiver. According to one example embodiment, for a given number of subcarriers $N_{sc}$ (e.g., 48), and a given set of RATEs (RATE={$RATE_1, \ldots, RATE_M$}), the set of subcarrier signal to noise (SNR) thresholds in $g_{RATE}=\{g_{RATE_1}, \ldots, g_{RATE}\}$ may be pre-defined and ranked in ascending order. As used herein, $g_{RATE_1}$ is the SNR threshold value for the $k^{th}$ type of RATE combination (modulation and encoding) that provides a minimal acceptable channel performance level (e.g., BER $10^{-5}$), where it is assumed that there is only additive white Gaussian noise (AWGN) in each subcarrier. For example, in the IEEE 802.11a communication model, the threshold value $g_{RATE1}$ is calculated for BPSK (lowest order modulation) with a coding rate of R=½ (lowest order coding).

In this regard, according to an example embodiment, for each number of active subcarriers $N_{on}=1 \ldots N_{sc}$, SMA 202 computes a signal performance level at the receiver. According to one embodiment, SMA 202 identifies the signal to noise ratio (SNR) γ, as follows:

$$\gamma(N_{on}) = \frac{P_{total}}{\sum_{i=1}^{N_{on}} \sigma_i^2} \quad [1]$$

For each SNR performance threshold ($g_{RATE_m}$), SMA 202 identifies the maximal number of subcarriers $N_{on}$ that provides at least a threshold channel performance, e.g., that satisfies:

$$\gamma(N_{on\,m}) \leq g_{RATE_m} \quad [2]$$

Subcarriers which fail to provide a threshold performance level at the each (e.g. $m^{th}$) RATE performance threshold (i.e., $g_{RATE_m}$) may be deactivated. As used herein, subcarrier deactivation may mean that no substreams are mapped to the subcarrier, that the subcarrier receives a power allocation coefficient of zero, effectively eliminating any transmit power being applied to the subcarrier, or both.

In block 306, SMA 202 sets a transmit coding rate and modulation corresponding to the identified RATE(s), and computes the throughput (T) for each $RATE_m$. According to one example implementation the transmit power control manager of SMA 202 calculates the throughput for each RATE as $T_m=RATE_m N_{on_m}$, although the invention is not limited in this regard.

Having computed the throughput (T) for each of the rates, SMA 202 finds the maximal throughput and corresponding RATE for given channel characteristics. In this regard, the transmit power control manager of SMA 202 identifies the maximum throughput index $q=argmax(T_m)$, for m=1 ... M, and then computes the optimal throughput for the given channel conditions as:

$$T^{opt}=T_q, RATE^{opt}=RATE_q, \text{ and } N_{on}^{opt}=N_{on_q} \quad [3]$$

Thus, the transmit power control manager of SMA 202 sets the transmitting coding rate and modulation corresponding to $RATE^{opt}$, and the active number of subcarriers to $N_{on}^{opt}$. In this regard, SMA 202 may generate one or more coding type, modulation type and bit mask control signals to effect the given coding rate, modulation type and number of active subcarriers to one or more of the coders, mappers and serial to parallel transform elements of an associated transmitter, and the decoders, demappers and parallel to serial transform elements of an associated receiver.

In block 308, SMA 202 distributes the overall transmit power budget among the active subcarriers, $N_{on}^{opt}$. According to one embodiment, transmit power control manager of SMA 202 distributes the overall transmit power budget $P_{total}$ among the active subcarriers in accordance with the following algorithm:

$$P_i = \frac{\sigma_i^2}{\sum_{j=1}^{N_{on}^{opt}} \sigma_j^2} \cdot P_{total} \qquad [4]$$

for i=1 ... $N^{opt}_{on}$. According to one embodiment, using the sorting index table, SMA 202 may place the computed power value $P_i$ for each of the corresponding subcarriers in the real spectrum. According to one embodiment, SMA 202 may then generate power coefficients in accordance with the identified power level $P_i$, and issues a control signal including such content to the weighting and equalization block(s) of an associated transmitter and/or receiver, although the scope of the invention is not limited in this regard.

Accordingly, SMA 202 effectively identifies and removes underperforming subcarriers, identifies the optimum RATE for the remaining ($N_{on}$) subcarriers, and distributes a power budget among the active subcarriers, thereby improving the overall channel throughput within a given power budget when compared to traditional techniques.

According to one example embodiment, to meet regulatory power requirements, SMA 202 may compare the transmit power distribution against a regulatory threshold, e.g., $$P_i^{OPT} \leq P_{threshold}^{Govt\_agency}.$$

If the foregoing inequality is not valid for some subcarrier, SMA 202 selectively excludes the subcarrier from the $RATE_m$ subcarrier subset. For this subcarrier, a lower order RATE ($RATE_{m-1}$) may be used.

Once the subcarrier puncturing, RATE assignments, and power distribution is identified, SMA 202 may issue a control signal (in-band, or out-of-band) including one or more of channel characteristics and/or the channel processing characteristics to the remote device for use in subsequent channel processing.

In view of the foregoing, those skilled in the art will appreciate that embodiments of SMA 202 improves the effective channel throughput within a given power budget by puncturing (or, removing) subcarriers that fail to meet a performance threshold. That is, SMA 202 reallocates power that may have been applied to such "bad" subcarriers to the remaining "good" subcarriers, which may enable some of the subcarriers to operate at a higher RATE (modulation plus encoding) than they would have under traditional power control schemes, thereby increasing channel throughput. These bit allocations and power distributions serve to increase (or, maximize) a total data rate and guarantees that the performance metric is greater than or equal to a threshold channel performance value (e.g., BER=$10^{-5}$)

Figure 4:
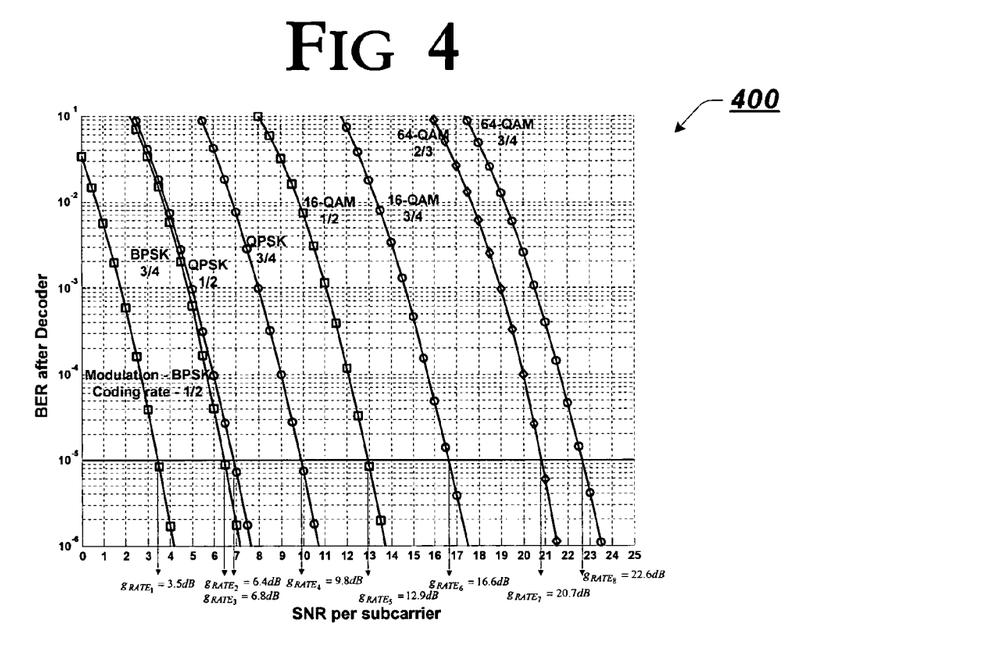
FIG. 4 is a graphical illustration of channel performance according to embodiments of the invention.

Turning briefly to FIG. 4, a graphical illustration 400 plotting receiver performance versus signal characteristics is provided. In particular, FIG. 4 illustrates a bit-error rate (channel quality characteristic) measured after the decoder of a receiver, versus the signal to noise ratio (SNR) per subcarrier for a conventional OFDM system. This figure illustrates how the values of thresholds may be selected for each rate. For example, we see that BER curve for BPSK ½ (leftmost curve) crosses the BER=$10^{-5}$ level at SNR approximately equal to 3.5 dB. Therefore each subcarrier having SNR below 3.5 dB is turned off (punctured). Thus the curve of BER after decoder for rate 6 MBPS was measured to determine the threshold value ($g_{RATE1}$=3.5 dB) for this rate. The same is for any other curve.

Figure 5:
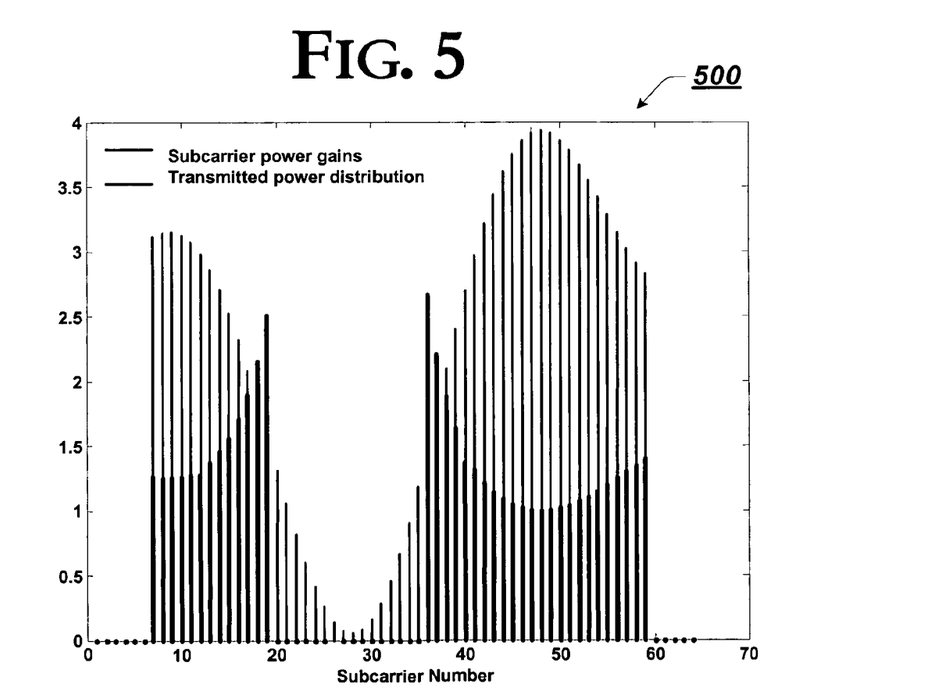
FIG. 5 is a graphical illustration of subcarrier puncturing and power allocation according to embodiments of the invention.

In FIG. 5, a graphical illustration 500 of the subcarriers of the wireless communication channel after subcarrier puncturing and power allocation by the SMA 202, according to the teachings of the present invention is shown. More particularly, FIG. 5 illustrates the power per subcarrier allocation for a given channel realization. A graphical illustration of the increased throughput is presented with reference to FIG. 6.

Figure 6:
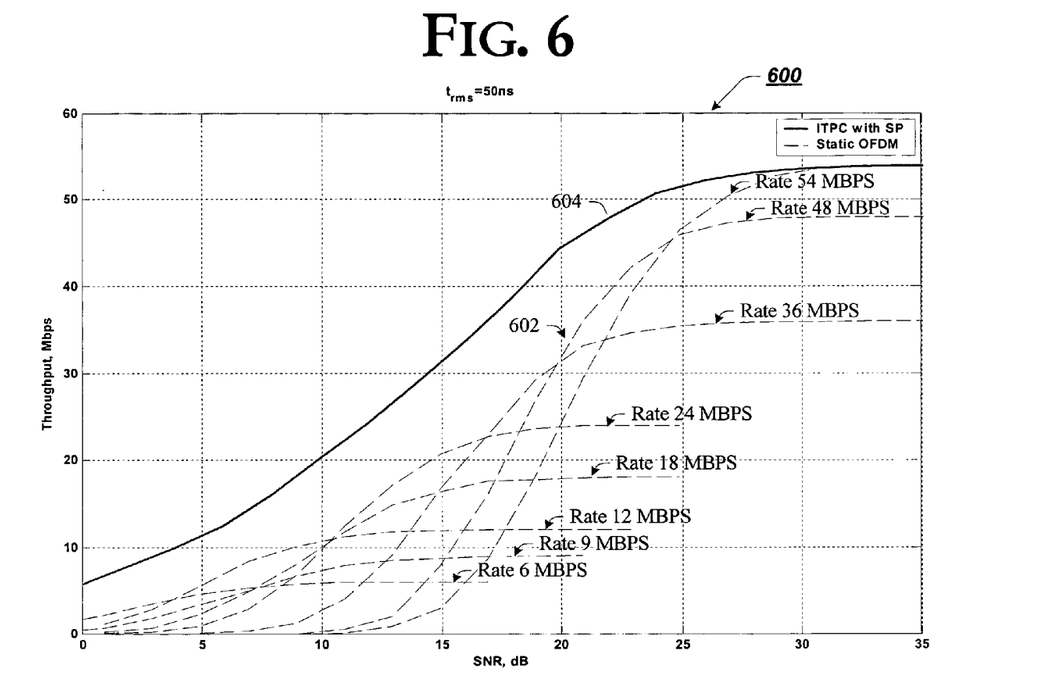
FIG. 6 is a graphical illustration of an example performance evaluation according to embodiments of the invention.

FIG. 6 is a graphical illustration 600 evidencing the improvement in channel throughput realized through use of the subcarrier management agent 202, according to one example implementation of the present invention. More particularly, FIG. 6 compares the performance of conventionally processed OFDM channels 602 to those of the SMA employing intelligent transmit power control with subcarrier puncturing techniques 604. As shown, the SMA 202 provides a 4-5 decibel (dB) gain over a channel processed in accordance with conventional techniques in a traditional OFDM system.

Alternate Embodiment(s)

Figure 7:
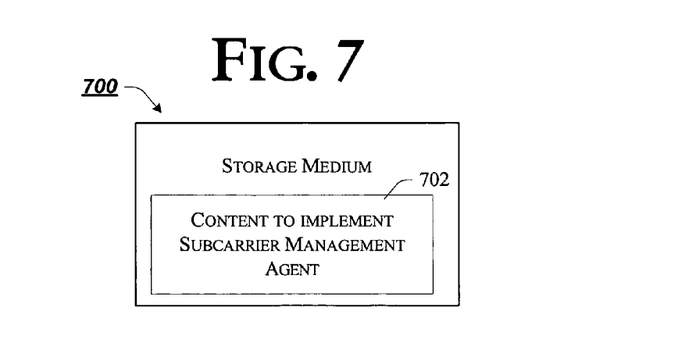
FIG. 7 is a block diagram of an example article of manufacture including content which, when executed by an accessing machine, causes the machine to implement one or more aspects of embodiment(s) of the invention.

FIG. 7 illustrates a block diagram of an example storage medium comprising content which, when invoked, may cause an accessing machine to implement one or more aspects of the subcarrier management agent 202 and/or associated methods 300. In this regard, storage medium 700 includes content 702 (e.g., instructions, data, or any combination thereof) which, when executed, causes an accessing appliance to implement one or more aspects of SMA 202, described above.

The machine-readable (storage) medium 700 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection).

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), sensor networks, personal area networks (PANs) and the like, although the scope of the invention is not limited in this respect.

Types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, such as those shown in FIGS. 1 and/or 2, or may be embodied in machine-executable content (e.g., instructions) 702, which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Any number of variations of the inventive concept are anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A method comprising:
   identifying at least a subset of a plurality of subcarrier(s) within a wireless channel that fail to meet a threshold channel performance metric;
   deactivating the identified subset of the plurality of subcarriers; and
   selectively distributing a power budget across a remaining subset of active subcarriers ($N_{on}$) to provide a substantially optimal channel throughput within the given power budget by determining a throughput for each of a plurality of combinations of modulation and encoding type (RATE(s)), identifying a maximal rate for a given set of channel characteristics and distributing the overall transmit power budget $P_{total}$ among the active subcarriers according to the following algorithm for generating a power coefficient for an $i^{th}$ subcarrier, $$P_i = \frac{\sigma_i^2}{\sum_{j=1}^{N_{on}^{opt}} \sigma_j^2} \cdot P_{total},$$

for i=1 ... $N_{on}$.

2. A method according to claim 1, the identifying underperforming subcarriers comprising:
   sorting the subcarriers according to a channel performance metric; and
   identifying as a threshold among the sorted subcarriers a subcarrier that fails to meet a channel performance metric threshold, wherein the subcarriers above or below the threshold are identified as bad subcarrier.

3. A method according to claim 2, wherein the channel characteristics used to identify underperforming subcarriers are obtained from a remote device.

4. A method according to claim 3, the channel state information comprising one or more channel processing parameters including bit loading, coding type, modulation type and power allocation, determined by the remote device.

5. A method according to claim 3, wherein the channel state information is representative of one or more of channel performance characteristics and channel quality characteristics.

6. A method according to claim 5, wherein the channel performance characteristics include radio frequency (RF) characteristics comprising one or more of a received signal strength indication (RSSI), a signal to noise ratio (SNR), a signal to interference and noise ratio (SINR), fading characteristic(s), and Doppler characteristics.

7. A method according to claim 5, wherein the channel quality characteristics include one or more of a bit-error rate (BER), a packet-error rate (PER), a symbol-error rate (SER), and a frame error rate (PER).

8. A method according to claim 2, wherein the subcarriers are initially sorted based, at least in part, on an effective noise power associated with each of the subcarriers.

9. A method according to claim 8, wherein the threshold channel performance metric is a signal to noise ratio (SNR).

10. A method according to claim 9, wherein bad subcarriers are identified as those failing to meet a threshold signal to noise ratio.

11. A method according to claim 1, further comprising:
   issuing a message to a remote transmitter to apply the power distribution among the remaining subset of the plurality of subcarriers.

12. A method according to claim 2, wherein the channel characteristics used to identify underperforming subcarriers are measured at a local receiver.

13. An apparatus comprising:
   a transceiver, to establish a multicarrier communication channel with a remote transceiver; and
   a subcarrier management agent (SMA), coupled with the transceiver, to identify at least a subset of a plurality of subcarrier(s) within a wireless channel that fail to meet a threshold channel performance metric, deactivate the identified subset of the plurality of subcarriers, and to selectively distribute a power budget across a remaining subset of active subcarriers ($N_{on}$) to provide a substantially optimal channel throughput within the given power budget, wherein the SMA determines a throughput for each of a plurality of combinations of modulation and encoding type (RATE(s)), identifies a maximal rate for a given set of channel characteristics, and distributes the overall transmit vower budget $P_{total}$ among the remaining active subcarriers by generating a power coefficient for an $i^{th}$ subcarrier in accordance with the following algorithm, $$P_i = \frac{\sigma_i^2}{\sum_{j=1}^{N_{on}^{opt}} \sigma_j^2} \cdot P_{total},$$

for i=1 ... $N_{on}$.

14. An apparatus according to claim 13, wherein the SMA identifies underperforming subcarriers by sorting the subcarriers using a channel characteristic of the subcarriers, and identifying as a threshold among the sorted subcarriers a subcarrier that fails to meet a channel performance metric, wherein the subcarriers above or below the threshold are identified as bad subcarriers.

15. An apparatus according to claim 14, wherein the SMA sorts the subcarriers according to an effective noise power (σ) of the subcarriers, and then identifies as the threshold a subcarrier that fails to meet a signal to noise (SNR) threshold (γ).

16. An apparatus according to claim 15, wherein one or more of the effective noise power and the signal to noise ratio associated with the subcarriers is determined from received, or perceived, channel state information.

17. An apparatus according to claim 15, the channel state information comprising one or more channel processing parameters including bit loading, coding type, modulation type and power allocation, determined by the remote device.

18. An apparatus according to claim 17, wherein the channel state information is representative of one or more of channel performance characteristics and channel quality characteristics.

19. An apparatus according to claim 18, wherein the channel performance characteristics include radio frequency (RF) characteristics comprising one or more of a received signal strength indication (RSSI), a signal to noise ratio (SNR), a signal to interference and noise ratio (SINR), fading characteristic(s), and Doppler characteristics.

20. An apparatus according to claim 18, wherein the channel quality characteristics include one or more of a bit-error rate (BER), a packet-error rate (PER), a symbol-error rate (SER), and a frame error rate (PER).

21. An apparatus according to claim 13, wherein the power coefficients are applied to a weighting block of the transceiver prior to transmission of a channel of the plurality of active subcarriers.

22. A system comprising:
one or more dipole antenna(e);
a transceiver, coupled with at least a subset of the one or more antenna(e), to establish a multicarrier communication channel with a remote transceiver; and
a subcarrier management agent (SMA), coupled with the transceiver, to identify at least a subset of a plurality of subcarrier(s) within a wireless channel that fail to meet a threshold channel performance metric, deactivate the identified subset of the plurality of subcarriers, and to selectively distribute a power budget across a remaining subset of active subcarriers ($N_{on}$), to provide a substantially optimal channel throughput within the given power budget, wherein the SMA determines a throughput for each of a plurality of combinations of modulation and encoding type (RATE(s)), identifies a maximal rate for a given set of channel characteristics, and distributes the overall transmit power budget $P_{total}$ among the remaining active subcarriers by generating a power coefficient for an $i^{th}$ subcarrier in accordance with the following algorithm, $$P_i = \frac{\sigma_i^2}{\sum_{j=1}^{N_{on}^{opt}} \sigma_j^2} \cdot P_{total},$$

for i=1 ... $N_{on}$.

23. A system according to claim 22, wherein the SMA identifies underperforming subcarriers by sorting the subcarriers using a channel characteristic of the subcarriers, and identifying as a threshold among the sorted subcarriers a subcarrier that fails to meet a channel performance metric, wherein the subcarrier above or below the threshold are identified as bad subcarriers.

24. A system according to claim 23, wherein the SMA sorts the subcarriers according to an effective noise power (σ) of the subcarriers, and then identifies as the threshold a subcarrier that Thus to meet a signal to noise (SNR) threshold (γ).

25. A system according to claim 24, wherein one or more of the effective noise power and the signal to noise ratio associated with the subcarriers is determined from received, or perceived, channel state information.

26. A system according to claim 23, the channel state information comprising one or more channel processing parameters including bit loading, coding type, modulation type and power allocation, determined by the remote device.

27. A system according to claim 23, wherein the channel state information is representative of one or more of channel performance characteristics and channel quality characteristics.

28. A system according to claim 23, wherein the channel performance characteristics include radio frequency (RF) characteristics comprising one or more of a received signal strength indication (RSSI), a signal to noise ratio (SNR), a signal to interference and noise ratio (SINR), fading characteristic(s), and Doppler characteristics.

29. A system according to claim 22, wherein the power coefficients are applied to a weighting block of the transceiver prior to transmission of a channel of the plurality of active subcarrier.

30. A storage medium comprising content which, when executed by an accessing device, enables the device to identify at least a subset of a plurality of subcarrier(s) within a wireless channel that fail to meet a threshold channel performance metric, to deactivate the identified subset of the plurality of subcarriers, and to selectively distribute a power budget across a remaining subset of active subcarrier ($N_{on}$) to provide a substantially optimal channel throughput within the given power budget, and comprising content to cause the accessing device to determine a throughput for each of a plurality of combinations of modulation and encoding type (RATE(s)), identify a maximal rate for a given set of channel characteristics and to distribute the overall transmit vower budget $P_{total}$ among the active subcarriers according to the following algorithm for generating a power coefficient for an $i^{th}$ subcarrier, $$P_i = \frac{\sigma_i^2}{\sum_{j=1}^{N_{on}^{opt}} \sigma_j^2} \cdot P_{total},$$

for i=1 ... $N_{on}$.

31. A storage medium according to claim 30, wherein the content to identify the subset of subcarriers that fail to meet a threshold channel performance metric includes content to cause an accessing device to sort the plurality of subcarriers by a channel characteristic, and to identify a threshold among the sorted subcarrier a subcarrier that fails to meet a channel performance metric threshold.

32. A storage medium according to claim 31, wherein the channel characteristic is an effective noise power ($\sigma$), and the channel performance metric is a signal to noise ratio ($\gamma$).

* * * * *